United States Patent
Bergeron

(10) Patent No.: US 7,264,126 B1
(45) Date of Patent: Sep. 4, 2007

(54) SUPPORTS FOR STORING SHEETS OF GRANITE, STONE, GLASS, AND OTHER MATERIALS

(75) Inventor: Russell John Bergeron, Spring, TX (US)

(73) Assignee: Bergeron Enterprises, Inc., Spring, TX (US)

( * ) Notice: Subject to any disclaimer, the term of this patent is extended or adjusted under 35 U.S.C. 154(b) by 249 days.

(21) Appl. No.: 10/984,732

(22) Filed: Nov. 9, 2004

(51) Int. Cl.
*A47G 19/08* (2006.01)

(52) U.S. Cl. .................. 211/41.14; 211/41.15; 206/454

(58) Field of Classification Search ............ 211/41.14, 211/41.15; 206/454, 448, 321; 248/441.1
See application file for complete search history.

(56) References Cited

U.S. PATENT DOCUMENTS

| | | | | |
|---|---|---|---|---|
| 1,914,241 A * | 6/1933 | Campbell | ................ | 211/41.15 |
| 2,946,453 A * | 7/1960 | Pityo | ................ | 211/41.14 |
| 2,978,270 A * | 4/1961 | Verheggen | ................ | 294/67.22 |
| 3,878,942 A * | 4/1975 | Hansen et al. | ................ | 206/454 |
| 3,924,871 A * | 12/1975 | Mesenbring | ................ | 280/845 |
| 3,927,764 A * | 12/1975 | Fox | ................ | 206/451 |
| 3,955,676 A * | 5/1976 | Hansen et al. | ................ | 206/451 |
| 4,092,815 A * | 6/1978 | Rowley et al. | ................ | 53/399 |
| 4,156,498 A * | 5/1979 | Miller | ................ | 294/151 |
| 4,195,738 A * | 4/1980 | O'Neal | ................ | 211/41.14 |
| 4,492,071 A * | 1/1985 | Gibson | ................ | 53/442 |
| 4,778,064 A * | 10/1988 | Gold | ................ | 211/41.14 |
| 5,085,329 A * | 2/1992 | Crowell et al. | ................ | 211/195 |
| 5,148,924 A | 9/1992 | Mason et al. | | |
| 5,505,574 A * | 4/1996 | Piazza | ................ | 414/267 |
| 5,850,924 A * | 12/1998 | Borter | ................ | 211/41.14 |
| 6,386,376 B1 | 5/2002 | Mendoza-Castillo | | |
| 6,536,607 B1 | 3/2003 | Knoll et al. | | |
| 7,143,901 B1 * | 12/2006 | Groves | ................ | 211/41.14 |
| 2003/0173314 A1 * | 9/2003 | Knoll et al. | ................ | 211/41.14 |

* cited by examiner

*Primary Examiner*—Richard E. Chilcot, Jr.
*Assistant Examiner*—Lindsay M. Maguire
(74) *Attorney, Agent, or Firm*—Mary J. Gaskin

(57) ABSTRACT

Supports used in pairs for storing and handling large sheets of heavy materials such as granite, stone and glass. Each support comprises a vertical, steel A-frame welded to a horizontal steel I-beam. Spaced-apart steel post holders are welded to the web of the I-beam. Removable vertical steel posts are inserted into some or all of the post holders to create "slots" for holding and supporting the sheets of material. Inserts can be placed in cavities parallel to the flanges of the I-beam to prevent the edges of the sheets of material from hitting the I-beam. Protective coatings can be attached or applied to the surfaces of the A-frame, the posts and the I-beam in order to protect the sheets of material. When the supports are used, sheets of material can be moved away from each other, utilizing the A-frame and posts, when a particular sheet is selected for removal.

7 Claims, 5 Drawing Sheets

SUPPORTS FOR STORING SHEETS OF GRANITE, STONE, GLASS, AND OTHER MATERIALS

FIELD OF THE INVENTION

The present invention relates to supports for storing and providing convenient access to large rectangular sheets of heavy material such as granite, stone, glass and similar materials.

BACKGROUND OF THE INVENTION

Granite, stone, glass, and similar materials are typically formed into large, rectangular sheets for distribution to wholesalers. Such sheets, typically having surface dimensions such as 5'×10' or 4'×8', are very heavy and hard to handle, both when storing and selecting particular sheets for removal.

Presently, some wholesalers simply stack the sheets on the floor. When storing the sheets vertically, other wholesalers use simple plywood frames with limited load weight capacity, or simply lean the sheets against a wall. Such treatment can result in damage to the individual sheets. Further, selecting and removing a particular sheet can be time consuming and difficult. Finally, as individual pieces are removed, uncontrolled movement of the heavy, cumbersome sheets can be dangerous to the handlers.

A need exists for a system for storing large sheets of heavy materials vertically and for providing means for removing individual pieces safely.

SUMMARY OF THE INVENTION

The present invention provides supports which are used in pairs to store large sheets of heavy surface materials such as granite or similar products, stone, plate glass, plastic, plywood, and aluminum, as well as non-ferrous "flats." The supports can be used to store multiple sheets having surface dimensions ranging from 24" to 60" in width, 48" to 120" in length, and ⅛" to 2" thick.

Each support consists of a vertical steel A-frame mounted on a horizontal steel I-beam. The structural steel is fabricated without sharp edges. Several steel tube holders are spaced apart inside the channel of the I-beam, each having an opening for holding a removable vertical steel post. The steel surfaces can be finished with a protective coating in order to minimize damage to the surfaces of the sheets of material that will be placed on the supports. In addition, inserts of wood or plastic can be inserted into the channels of the I-beam alongside the tube holders in order to minimize damage to the edges of the sheets of material.

In use, two separate supports are arranged parallel to each other, spaced 18 inches to 108 inches apart, depending on the dimensions of the sheets of material. Steel posts are placed in some or all of the post holders to create "slots" for the sheets of material. When the supports are being used, sheets of material, which have been secured in a hanging, vertical position, are elevated vertically and moved horizontally above a designated storage slot. The sheets of material are lowered vertically into the slot and released.

When a sheet of material is selected for removal, it can be accessed by moving adjacent sheets and propping them against adjacent vertical posts. The selected sheet is secured and lifted above the support and moved horizontally away from the supports.

It is an object of the present invention to provide a system of supports for vertically storing large sheets of heavy material, such as granite, glass, etc.

Another object of the present invention is to provide supports which allow handlers to select and remove individual sheets safely.

Yet another object of the present invention is to provide supports which do not damage the surface or edges of the sheets of material supported thereon.

A further object of the present invention is to provide a system of supports which can be used with large sheets of material of differing sizes.

One more object of the present invention is to provide adjustable support slots, created by removable vertical posts in post holders, thereby permitting handlers to have easier access to individual sheets.

BRIEF DESCRIPTION OF THE PREFERRED EMBODIMENT

Figure 1:
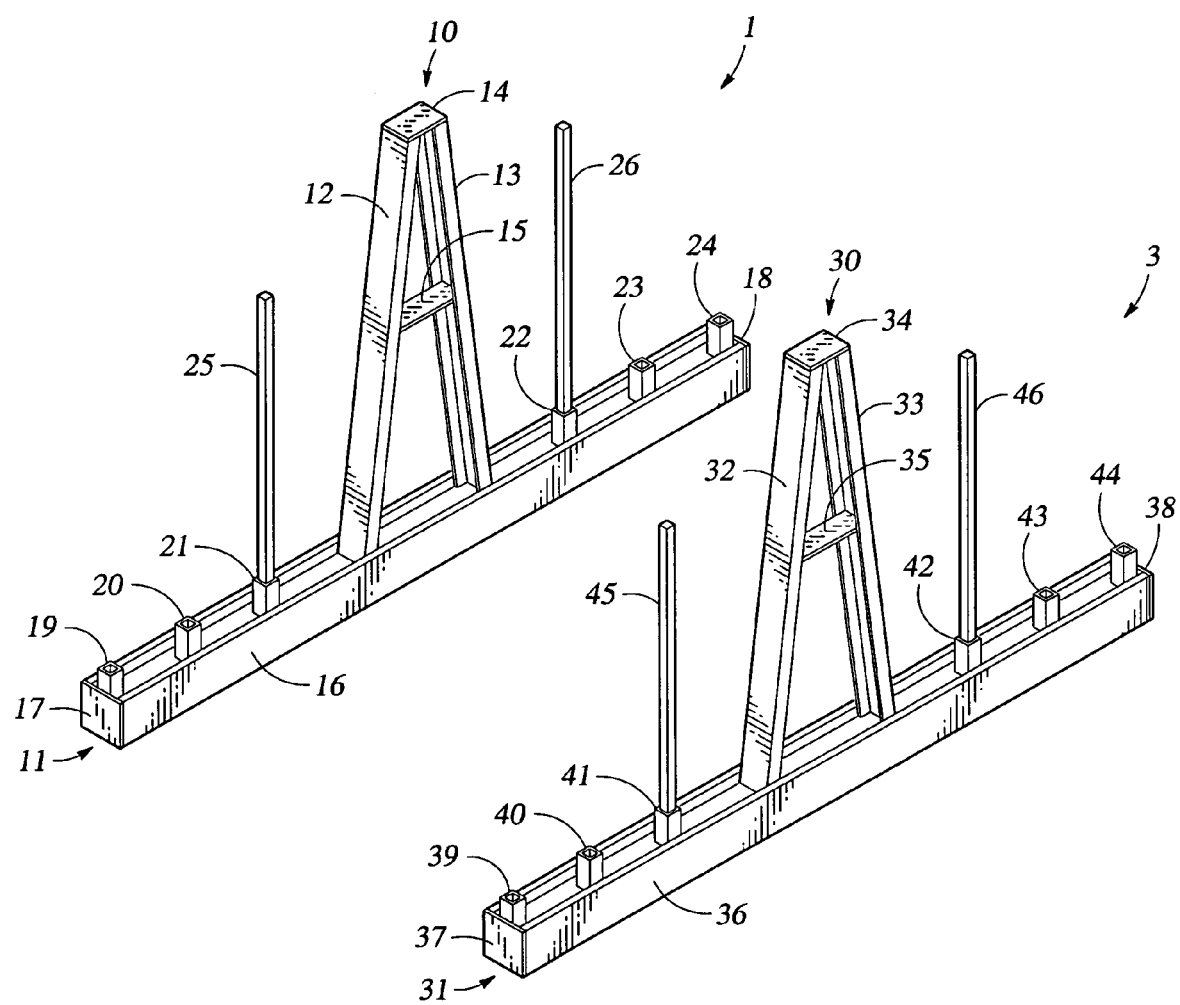
FIG. 1 is a perspective view of a pair of the supports of the present invention, arranged parallel to each other.

When the present invention is used, as shown in FIG. 1, two supports 1, 3 are arranged parallel to each other, spaced anywhere from 18 inches to 108 inches apart, depending on the dimensions of the sheets of material to be placed on the supports 1, 3, ensuring that support is provided for both ends of the sheets of material.

Each support 1 or 3 has a vertical A-frame 10 or 30 mounted onto a horizontal support beam structure, 11 or 31. The A-frame 10 or 30 comprises two steel channels 12, 13 or 32, 33, arranged in an inverted V, with a flat steel top plate 14 or 34 welded or bolted to the upper ends of the channels 12, 13 or 32, 33. The channels 12, 13 or 32, 33 can vary in length from four feet to six feet. The outer web of the channels 12, 13 or 32, 33 can be covered with rubber, plastic material, or carpet, in order to protect the sheets of material from being damaged. Each end of a steel gusset 15 or 35 is welded or bolted to the web portion of one of the channels 12, 13 or 32, 33. The lower ends of the channels 12, 13 or 32, 33 are welded or bolted to the support beam structure 11 or 31, which comprises an I-beam 16 or 36, which can vary in length from four feet to ten feet (shown here approximately eight feet long); a steel base end cap 17, 18 or 37, 38 welded or bolted to each end of the I-beam 16 or 36; as well as several open steel tube holders 19, 20, 21, 22, 23, 24 or 39, 40, 41, 42, 43, 44 (each approximately 4 to 6 inches high), spaced apart and welded or bolted to the web inside the flanges of the I-beam 16 or 36. A removable steel post 25, 26 or 45, 46 is placed inside one or more of the steel tube holders 21, 22 or 41, 42 to create "slots" for easier handling of large sheets of material. The length of the posts 25, 26 or 45, 46 can vary, depending on the size of the sheets of material to be stored on the supports 1, 3. The posts 25, 26 or 45, 46 shown are approximately four feet long.

The structural steel used in making the supports 1, 3 is fabricated without sharp edges. The surfaces of the structures comprising the A-frames 10 or 30 can be coated with plastic material, or covered with rubber or carpet, in order to minimize damage to the materials to be stored thereon. Similarly, the surfaces of the posts 25, 26 or 45, 46 can be covered with rubber, plastic, or another "cushioning" material.

Figure 2:
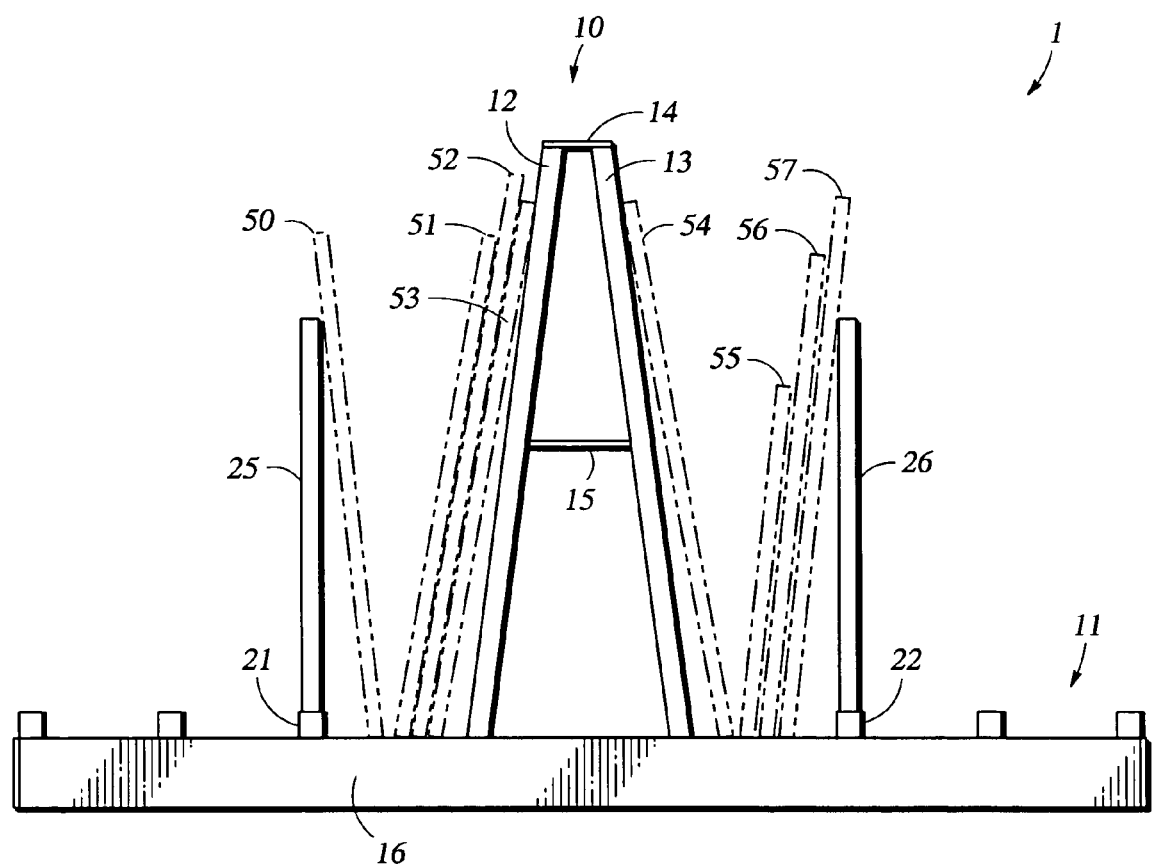
FIG. 2 is a side elevational view of one of the supports of the present invention, showing phantom sheets of material.

As shown in FIG. 2, heavy rectangular sheets 50, 51, 52, 53, 54, 55, 56, 57 can be stored on a pair of supports 1 (3) of the present invention. The lower ends of A-frame 10, formed from steel channels 12, 13, with top plate 14 and gusset 15, are welded or bolted to support beam structure 11, inside the flanges of I-beam 16. The lower end of steel post 25 has been inserted into the open end of steel post holder 21, and the lower end of steel post 26 has been inserted into the open end of steel post holder 22. Sheets of material 50, 51, 52, 53 are stacked vertically on one side of the A-frame 10 and sheets of material 54, 55, 56, 57 are stacked vertically on the other side of A-frame 10. Typically, loads of material are distributed equally to provide balance to the support 1. Sheet of material 51 can be accessed by moving sheet of material 50 to rest against post 25, leaving sheets of material 51, 52, 53 resting against channel 12 of A-frame 10. Sheet of material 54 can be accessed by moving sheets of material 55, 56, 57 to rest against post 26, leaving sheet of material 54 resting against channel 13 of A-frame 10.

Figure 3:
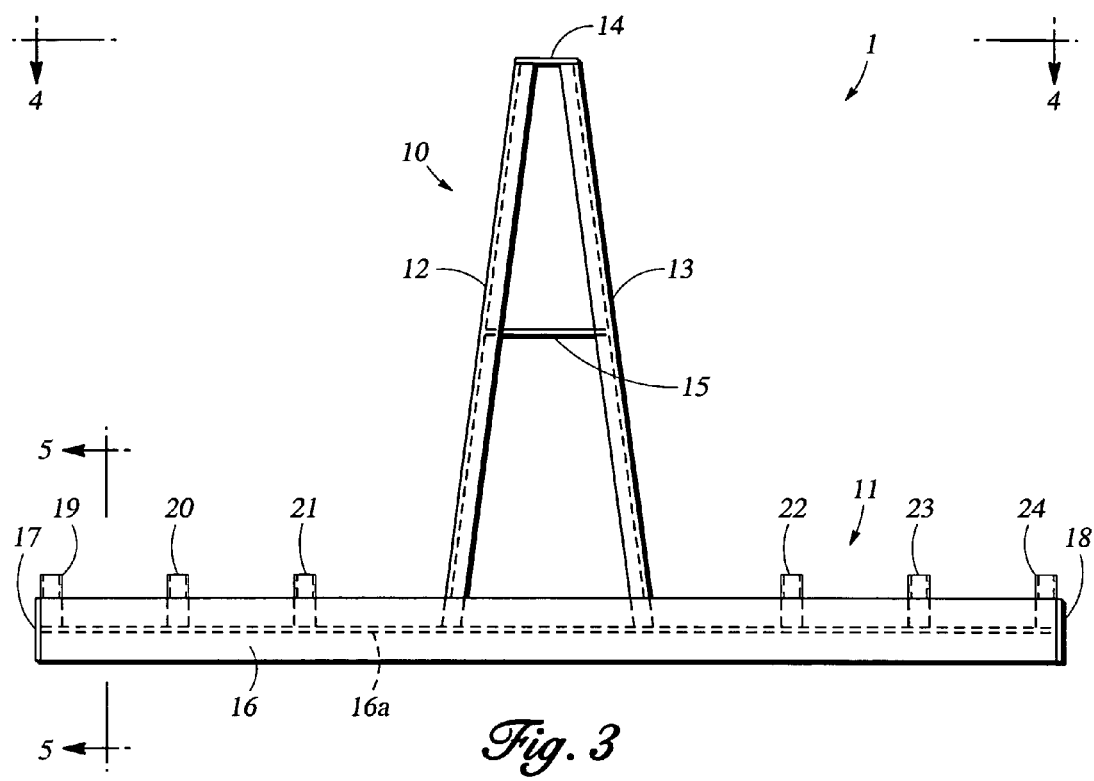
FIG. 3 is a side view of the supports of the present invention, showing the placement of the post holders in the I-beam.

FIG. 3 shows more clearly the attachment points of the A-frame 10 and the support beam structure 11. The steel top plate 14 is welded or bolted to the upper ends of the channels 12, 13, and each end of steel gusset 15 is welded or bolted to the inner web portion of one of the channels 12, 13 at the midpoint. The lower ends of the channels 12, 13 are welded or bolted to the web 16a of the I-beam 16, as are the lower ends of the post holders 19, 20, 21, 22, 23, 24. The outermost post holders 19, 24 are situated next to the end caps 17, 18, respectively.

Figure 4:
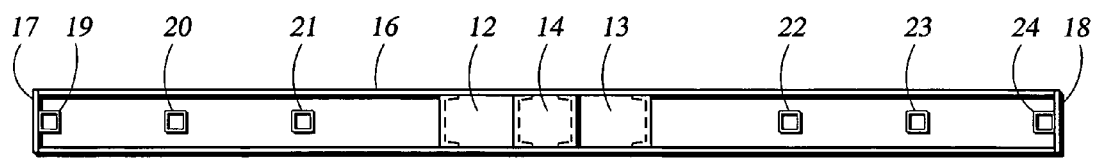
FIG. 4 is a top plan view of one of the support racks of the present invention.

The top plan view in FIG. 4 shows square-shaped post holders 19, 20, 21, 22, 23, 24. Alternatively, they can be made from cylindrical pieces of steel pipe, in which case the steel posts (i.e., 25, 26) placed therein would also be cylindrical in shape. (A cylindrical steel post could be covered with PVC [polyvinyl chloride] pipe in order to protect the sheets of material.) The position of the channels 12, 13 and the top plate 14 can also be seen.

Figure 5:
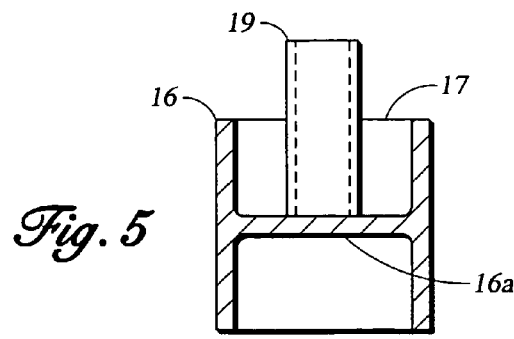
FIG. 5 is a cross-sectional view of an end of the support of the present invention, taken along line 5-5 of FIG. 3.

The detail drawing of FIG. 5 shows the bottom of post holder 19 welded or bolted to the web 16a of the I-beam 16, next to end plate 17, with space on either side of the post holder 19.

Figure 6:
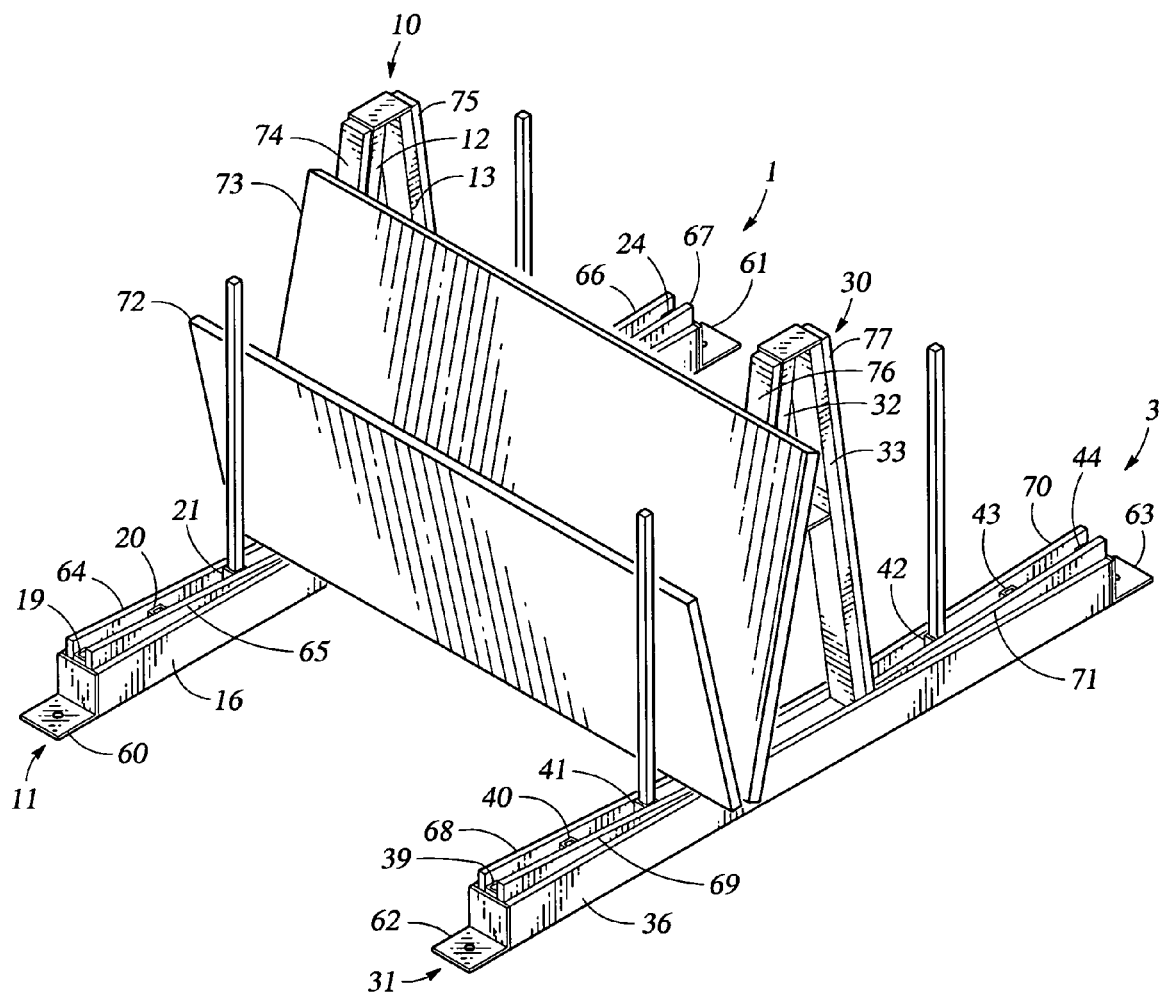
FIG. 6 is a perspective view of a pair of supports of the present invention, showing an alternate embodiment of the A-frame, as well as optional inserts and steel angles holding the ends of the supports in place.

FIG. 6 shows an alternate embodiment of the A-frame 10 and 30, described infra, as well as additional elements that can be used with the supports 1, 3 of the present invention. Steel angles 60, 61 and 62, 63 can be attached to the ends of I-beam 16 and 36 and bolted to the floor in order to keep the support beam structures 30 and 31 holding A-frames 10 and 30 from moving, thereby maintaining the parallel relationship of the pair of supports 1, 3. Further, inserts 64, 65, 66, 67 and 68, 69, 70, 71 can be placed inside the flanges of the I-beam 16 and 36 in order to "cushion" the edges of the sheets of material 72, 73, which rest against the support beam structures 11, 31. The inserts 64, 65, 66, 67, and 68, 69, 70, 71 can be made from wood, plastic, rubber, rolled carpet, or any other material which would not damage the edges of the sheets of material 72, 73. The A-frame 10, 30 comprises channels 12, 13 and 32, 33, with wooden boards 74, 75 and 76, 77 attached to each channel 12, 13 and 32, 33, respectively, to "cushion" the sheets of material 72, 73.

Figure 7:
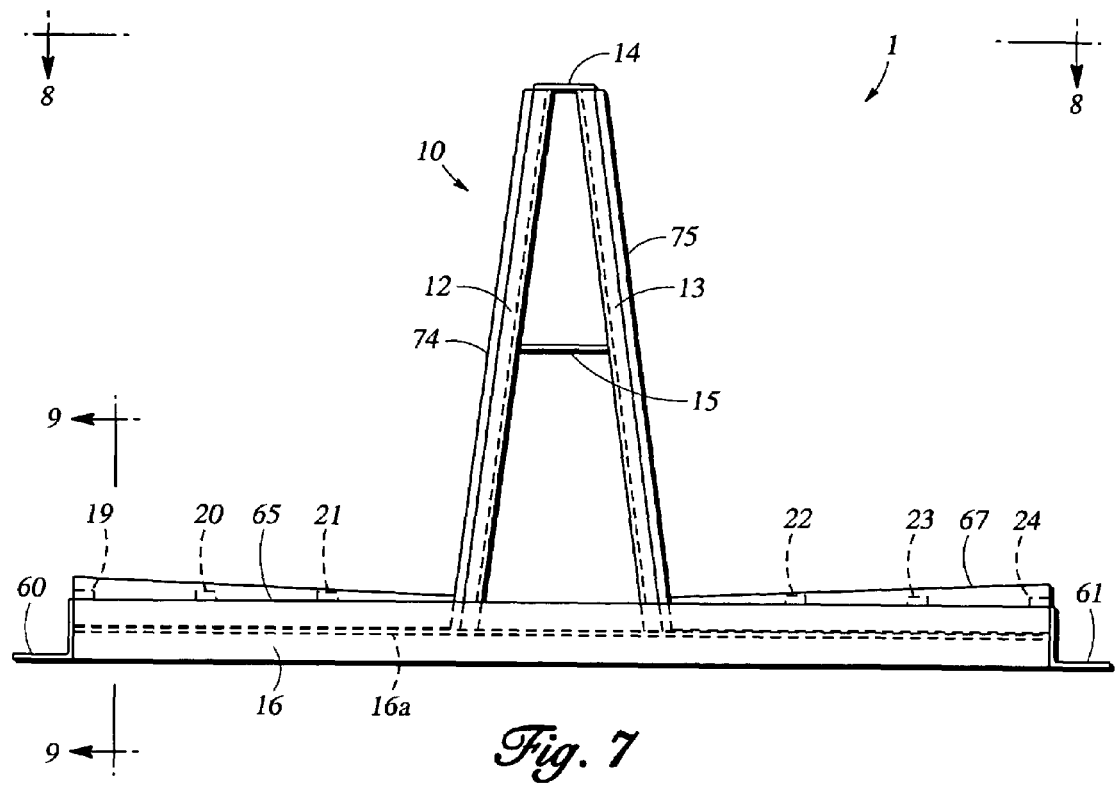
FIG. 7 is a side elevational view of a support of the present invention, showing the position of the inserts and the steel angles.

As shown in FIG. 7, channels 12, 13 have been inverted, with the toe portions pointing outward. The flat steel top plate 14 is welded or bolted to the upper end of the channels 12, 13, and each end of the steel gusset 15 is welded or bolted to the outer web portion of one of the channels 12, 13 at the midpoint. Wooden boards 74, 75 have been attached to the inner web portions of the channels 12, 13, with lag bolts, carriage bolts, or other fasteners (not shown). The outer edges of the wooden boards 74, 75 extend past the "toes" of the channels 12, 13 in order to provide a cushioning surface for the sheets of material (72, 73) to be stored on the supports 1 (3). The vertical portion of each steel angle 60, 61 is attached to an end of the I-beam 16, and the horizontal portion of the steel angle 60, 61 can be bolted to the floor. Each insert 65, 67 is trapezoidal in shape, with the long top side slightly inclined, or angled, down toward the A-frame 10, thereby creating a surface which urges the sheets of material toward A-frame 10. The long top side extends above the tops of post holders 19, 20, 21 and 22, 23, 24 in order to keep the edges of sheets of material from contacting the steel I-beam 16. The bottom flat side of each insert 65, 67 rests against the web 16a of the I-beam 16.

Figure 8:
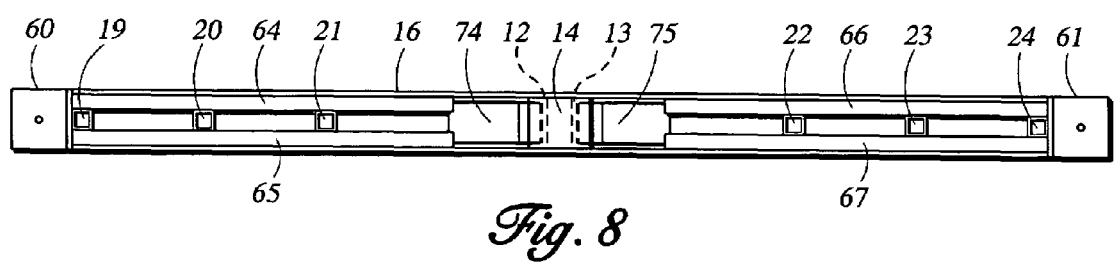
FIG. 8 is a top plan view of a support of the present invention.

As can be seen in FIG. 8, inserts 64, 65 and 66, 67 are arranged parallel to the I-beam, one on each side of the row of post holders 19, 20, 21 and 22, 23, 24, in cavities along the flanges of the I-beam 16. The channels 12, 13 are turned "toe" out, with the top plate 14 welded to the upper ends of the channels 12, 13. A wooden board 74, 75 has been attached to the inner web portion of each channel 12, 13. The horizontal portion of each angle 60, 61 can be bolted to the floor. Alternatively, the vertical portion of each angle 60, 61 can be welded or bolted to one side of the I-beam 16 instead of the ends.

Figure 9:
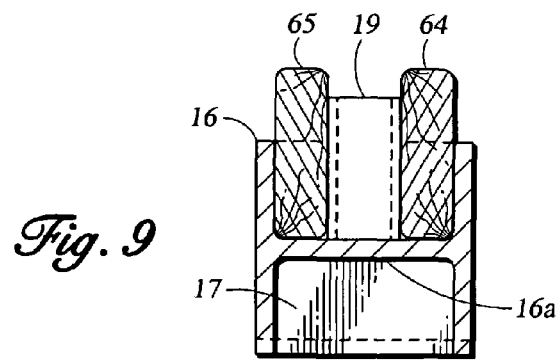
FIG. 9 is a cross-sectional view of an end of a support of the present invention, taken along line 9-9 of FIG. 7.

The detail drawing of FIG. 9 shows the bottom of post holder 19 welded to the web 16a of the I-beam 16 next to the end plate 17. An insert 64, 65 has been placed on each side of the post holder 19, parallel to the flange of the I-beam 16. The top edge of each insert 64, 65 extends above the top of the post holder 19, preventing the edges of sheets of material from hitting the steel I-beam 16.

I claim:

1. A system for supporting sheets of heavy material, the system comprising:

a first support member comprising a vertical steel A-frame mounted onto a mid-portion of a horizontal steel I-beam having a web and flanges, the I-beam having affixed to the web inside the flanges a plurality of spaced-apart post holders, each of the post holders having an opening;

a second support member comprising a second vertical steel A-frame mounted to onto a mid-portion of a second horizontal steel I-beam having a web and flanges, the second I-beam having affixed to the web inside the flanges a plurality of spaced-apart post holders, each of the post holders having an opening;

a plurality of removable steel posts for placement in the openings in the post holders;

the steel I-beam of the second support member being arranged parallel to the steel I-beam of the second support member, separated therefrom by a distance ranging from 18 inches to 108 inches.

2. The system of claim 1 wherein the A-frame member of the first support member and the A-frame member of the second support member each comprises two steel channels each having a length ranging from four feet to eight feet.

3. The system of claim 2 wherein each of the two steel channels has a web and toes and each A-frame member is constructed with the webs of the channels facing one to the other and the toes of the channels pointed outward, each channel further having a wooden board attached to the web of the channel, the board having an edge extending out past the toes of the channel.

4. The system of claim 1 wherein the first I-beam and the second I-beam have parallel flanges with the plurality of post holders spaced-apart therefrom, defining parallel cavities for holding inserts between the flanges and the post holders, the inserts having upper edges extending above the flanges of each of the first I-beam and the second I-beam.

5. The system of claim 4 wherein the inserts are made of wood, rubber, plastic, or carpet.

6. The system of claim 1 wherein the first I-beam and the second I-beam each have a first end and a second end, and a steel angle is affixed to each of the first end and the second end of both the first I-beam and the second I-beam, all of the angles designed for affixing the first I-beam and the second I-beam onto a surface.

7. The system of claim 6 wherein a process selected from welding and bolting is used for mounting the A-frame member onto the steel I-beam, for affixing the plurality of post holders to the I-beam, and for affixing the steel angles to the ends of the I-beams.

* * * * *